(12) United States Patent
Yano et al.

(10) Patent No.: US 11,181,811 B2
(45) Date of Patent: Nov. 23, 2021

(54) LENS DRIVING DEVICE, CAMERA DEVICE AND ELECTRONIC APPARATUS

(71) Applicant: New Shicoh Motor Co., Ltd., Jiashan (CN)

(72) Inventors: Tomoyoshi Yano, Yamato (JP); Kazuhiko Naito, Yamato (JP); Takashi Iwasaki, Yamato (JP)

(73) Assignee: NEW SHICOH MOTOR CO, LTD., Zhejiang (CN)

( * ) Notice: Subject to any disclaimer, the term of this patent is extended or adjusted under 35 U.S.C. 154(b) by 101 days.

(21) Appl. No.: 16/713,499

(22) Filed: Dec. 13, 2019

(65) Prior Publication Data

US 2020/0192195 A1 Jun. 18, 2020

(30) Foreign Application Priority Data

Dec. 13, 2018 (CN) .......................... 201811526663.1

(51) Int. Cl.
*G03B 17/42* (2021.01)
*H04N 5/225* (2006.01)
*G02B 7/02* (2021.01)
*G02B 7/09* (2021.01)

(52) U.S. Cl.
CPC .......... *G03B 17/425* (2013.01); *G02B 7/022* (2013.01); *H04N 5/2254* (2013.01); *G02B 7/09* (2013.01)

(58) Field of Classification Search
None
See application file for complete search history.

(56) References Cited

U.S. PATENT DOCUMENTS

| 2015/0309282 | A1* | 10/2015 | Lee | G03B 3/10 |
| | | | | 359/814 |
| 2016/0109680 | A1* | 4/2016 | Park | H04N 5/2254 |
| | | | | 359/824 |
| 2016/0139425 | A1* | 5/2016 | Park | G02B 7/08 |
| | | | | 359/557 |
| 2017/0329099 | A1* | 11/2017 | Ichihashi | G02B 7/08 |
| 2019/0107685 | A1* | 4/2019 | Kim | G03B 3/10 |

FOREIGN PATENT DOCUMENTS

JP  2016206531 A  12/2016

\* cited by examiner

*Primary Examiner* — Clayton E. LaBalle
*Assistant Examiner* — Dennis Hancock
(74) *Attorney, Agent, or Firm* — Hayes Soloway PC

(57) ABSTRACT

A lens driving device is describes that includes a stator and a mover, with a lens support for supporting the lens and for moving in an optical axis direction of the lens with respect to the stator. Any one of the stator and the mover has protruding portions and any other one of the stator and the mover has recessed portions into which the protruding portions are inserted. The protruding portions and the recessed portions each have opposing surfaces where the protruding portions and the recessed portions are opposed to each other, and a resin with viscoelasticity is provided to contact the opposing surfaces of the protruding portions and the opposing surfaces of the recessed portions.

10 Claims, 6 Drawing Sheets

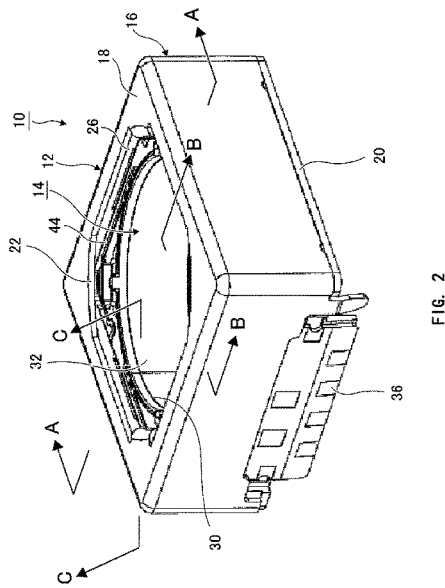
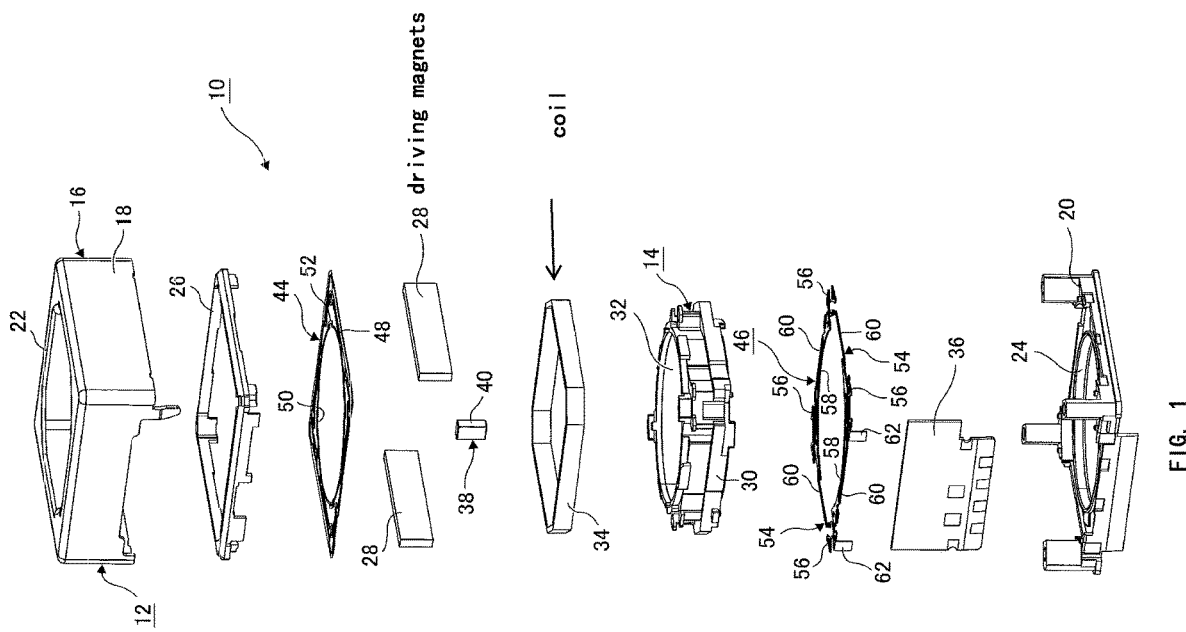

LENS DRIVING DEVICE, CAMERA DEVICE AND ELECTRONIC APPARATUS

CROSS-REFERENCE TO RELATED APPLICATION

This application claims the benefit of Chinese patent application CN201811526663.1, filed on Dec. 13, 2018, the contents of which are incorporated herein by reference herein.

TECHNICAL FIELD

The present disclosure relates to a lens driving device used in a camera device mounted on an electronic apparatus such as a smartphone, a camera device using the lens driving device, and an electronic apparatus mounted with the camera device.

BACKGROUND

In general, a small camera device is mounted on an electronic apparatus such as a smartphone, and a lens driving device is mounted on the camera device.

As an example of a conventional lens driving device, Japanese Patent Application Laid-Open No. 2016-206531 discloses a damper material in order to suppress resonance that occurs when a lens is focused.

In the above conventional example, a damper material is filled in the gap between the outer circumferential surface of the lens holder and the four-corner portion inner circumferential surfaces of the frame. A recessed portion is formed in the frame, and a part of the damper material is accumulated in this recess. Since the damper material is accumulated in the recess, the damper material can be prevented from falling off.

However, in the above conventional example, even if the damper material can be prevented from falling off, since only a part of the damper material is accumulated in the recess, it is difficult to control the amount, position, range, etc. of the damper material, and the arrangement of the damper material that contributes to resonance suppression is likely to be varied. As a result, the resonance suppression effect is also likely to be varied.

The present disclosure solves the above-described conventional problems, and an object of the present disclosure is to provide a lens driving device, a camera device and an electronic apparatus that can reduce variation in the resonance suppression effect.

SUMMARY

In accordance with one aspect of the present disclosure, there is provided a lens driving device including: a stator; and a mover including a lens support for supporting the lens and for moving in an optical axis direction of the lens with respect to the stator. Any one of the stator and the mover has protruding portions, and any other one of the stator and the mover has recessed portions into which the protruding portions are inserted. The protruding portions and the recessed portions each have opposing surfaces where the protruding portions and the recessed portions are opposed to each other, and resin with viscoelasticity is provided so as to contact the opposing surfaces of the protruding portions and the opposing surfaces of the recessed portions.

In accordance with another aspect of the present disclosure, there is provided a camera device including: the lens driving device described above; a lens on the lens support; and a light receiving sensor detecting light transmitted through the lens.

In accordance with still another aspect of the present disclosure, there is provided an electronic apparatus including the camera device described above.

According to the present disclosure, resin with viscoelasticity is provided on the opposing surfaces where the protruding portions provided on any one of the stator and the mover and the recessed portions into which the protruding portions are inserted. Thus, variation in the contact state between the resin with viscoelasticity and the protruding portions or recessed portions provided on the mover or the stator can be reduced. Therefore, variation in the resonance suppression effect can be reduced.

DESCRIPTION OF DRAWINGS

FIG. 1 is an exploded perspective view showing a lens driving device according to an embodiment of the present disclosure.

FIG. 2 is a perspective view showing the lens driving device according to the embodiment of the present disclosure.

DETAILED DESCRIPTION

Figure 4:
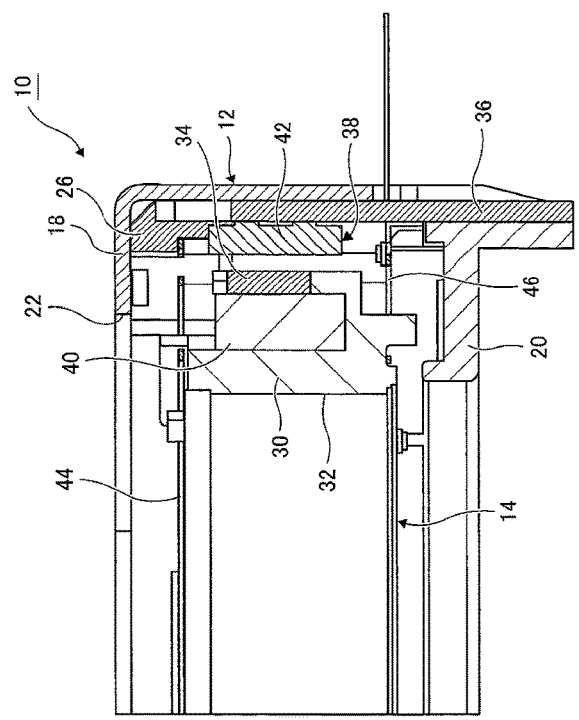
FIG. 4 shows the lens driving device according to the embodiment of the present disclosure, and is a cross-sectional view taken along line B-B of FIG. 2.

Next, the embodiments of the present disclosure will be discussed with respect to the drawings.

In FIG. 1 and FIG. 2, a lens driving device 10 is used in an auto-focusing small camera used in an electronic apparatus such as a mobile phone or a smartphone. In this specification, for the sake of convenience, the subject side in the optical axis direction of the lens driving device 10 is referred to as the front side, and the light receiving sensor side that receives light from the subject is referred to as the rear side.

The lens driving device 10 has a stator 12 and a mover 14. The stator 12 has a housing 16 provided so as to surround the mover 14. The housing 16 is configured to have a box-like body case 18 provided on the front side and a plate-like body base 20 provided on the rear side, wherein the case 18 is fixed to the base 20. The housing 16 has a substantially rectangular shape when viewed from the optical axis direction. Further, opening portions 22 and 24 are formed at the center of the case 18 and the base 20 of the housing 16, respectively.

Figure 3:
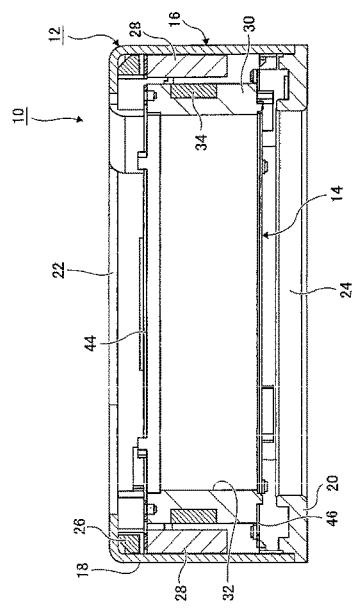
FIG. 3 shows the lens driving device according to the embodiment of the present disclosure, and is a cross-sectional view taken along line A-A of FIG. 2.

The front inner surface of case 18 is fixed with a spacer 26 having a substantially rectangular shape when viewed from the optical axis direction. Further, as shown in FIG. 3, driving magnets 28, 28 in a cuboid shape are fixed to two opposing inner surfaces of the case 18 behind the spacer 26.

Figure 6:
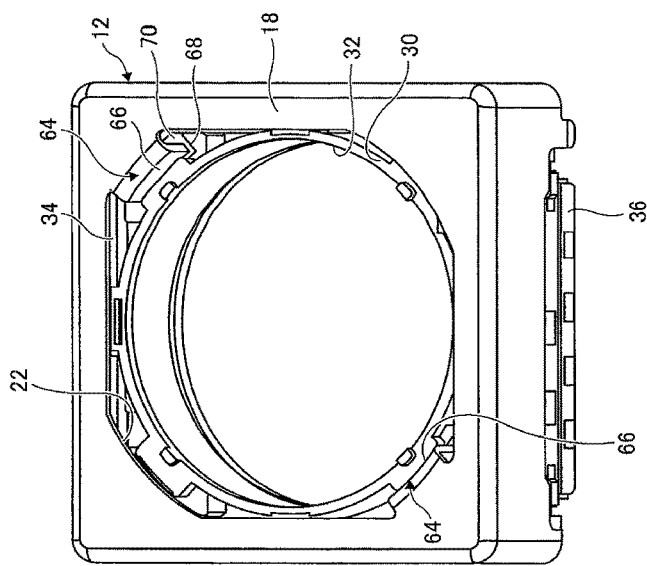
FIG. 6 is a perspective view showing a state in which a front side plate spring and a rear side plate spring has been removed from the lens driving device according to the embodiment of the present disclosure.
Figure 5:
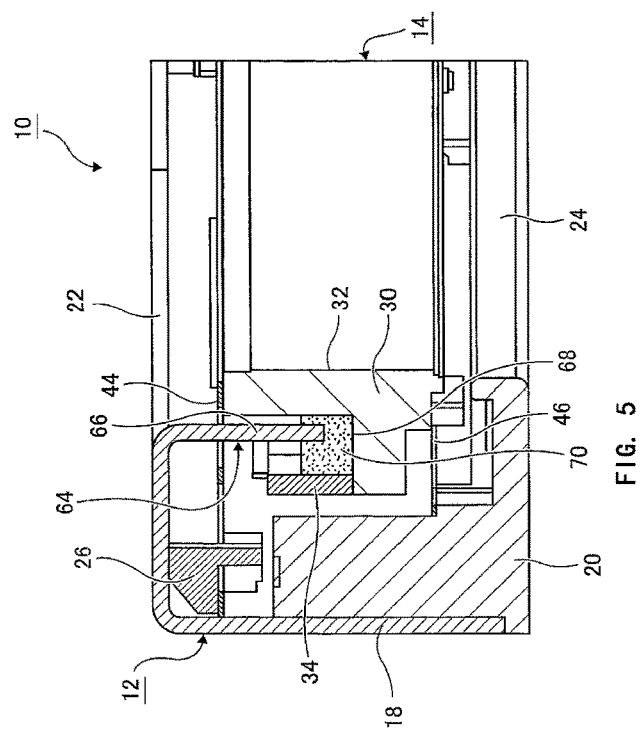
FIG. 5 shows the lens driving device according to the embodiment of the present disclosure, and is a cross-sectional view taken along line C-C of FIG. 2.
Figure 8:
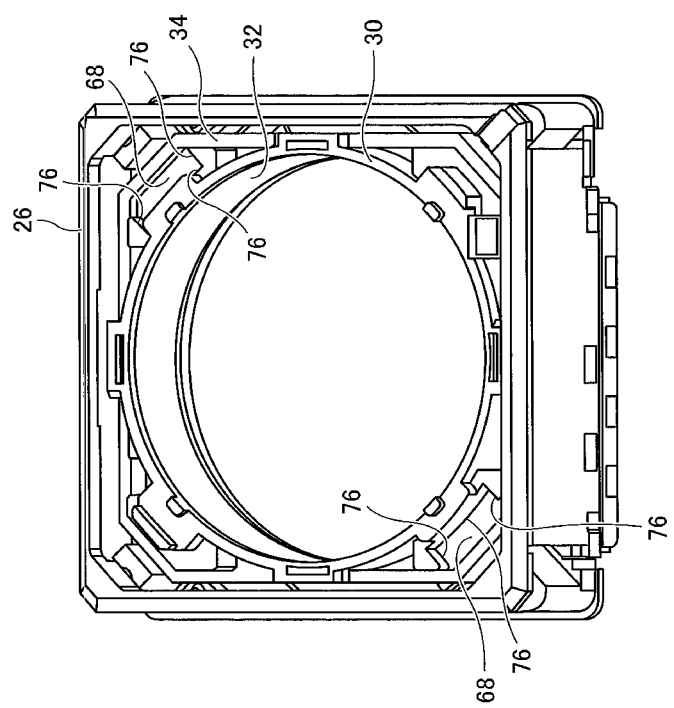
FIG. 8 is a perspective view showing a state in which the case and the resin with viscoelasticity have been removed from the state of FIG. 6 in the lens driving device according to the embodiment of the present disclosure.
Figure 7:
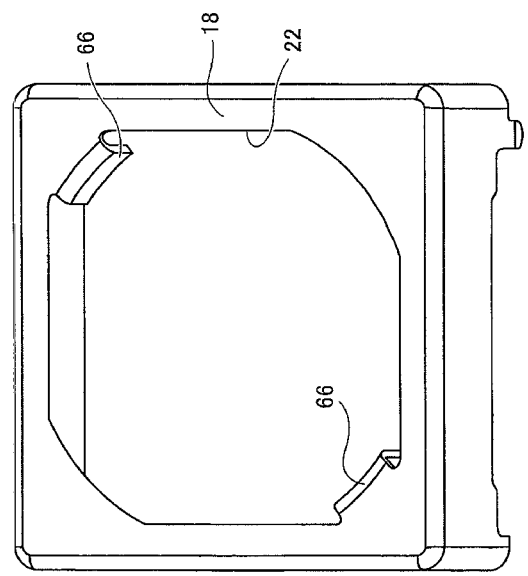
FIG. 7 is a perspective view showing a case used in the lens driving device according to the embodiment of the present disclosure.

The mover 14 is disposed in the housing 16. The mover 14 has a lens support 30 that supports the lens. The lens support 30 has a substantially circle shape when viewed from the optical axis direction. A lens fixing hole 32 for fixing the lens is formed inside the lens support 30. Further, a coil 34 with an octagonal shape when viewed from the optical axis direction of the lens is fixed to the circumference of the lens support 30 (see FIG. 6). The driving magnets 28, 28 are opposed to the coil 34. In the present embodiment, the case 18 is made of magnetic body and is arranged on the back surface of the driving magnets 28, 28, and has a function as a yoke through which the magnetic flux from the driving magnets 28, 28 passes.

A circuit board 36 is fixed to one side surface of the above base 20. The circuit board 36 has a portion protruding from the housing 16 to the rear side, and a power source or a control wire is connected to the protruding portion.

As shown in FIG. 4, the lens driving device 10 has a position detecting unit 38 that detects the position of the mover 14 in the optical axis direction, and the position detecting unit 38 is provided in the vicinity of one corner portion of the case 18. The position detecting unit 38 is composed of a position detecting magnet 40 that is fixed to the lens support 30, and a position detecting sensor 42 that is opposed to the position detecting magnet 40 and fixed to the circuit board 36. The position detecting sensor 42 is composed of, for example, a hall element, and when the mover 14 moves, the magnetic flux density of the magnetic flux flowing from the position detecting magnet 40 to the position detecting sensor 42 changes, and the position of the mover 14 can be detected.

The mover 14 is elastically supported by a front side plate spring 44 and a rear side plate spring 46 formed in a rectangular frame shape so as to be movable freely in the optical axis direction with respect to the stator 12. The front side plate spring 44 is composed of a stator side fixed portion 48 fixed to the rear side surface of the spacer 26, a mover side fixed portion 50 fixed to the front side surface of the lens support 30, and an arm portion 52 that connects the stator side fixed portion 48 and the mover side fixed portion 50. The arm portion 52 can be elastically deformed in the optical axis direction of the lens.

The rear side plate spring 46 is divided into two spring members 54, 54. Similar to the front side plate spring 44, the rear side plate spring 46 is composed of a stator side fixed portion 56 fixed to the front side surface of the base 20, a mover side fixed portion 58 fixed to the rear side surface of the lens support 30, and an arm portion 60 that connects the stator side fixed portion 56 and the mover side fixed portion 58. The arm portion 60 can be elastically deformed in the optical axis direction of the lens. Further, the spring members 54, 54 are provided with terminals 62, 62 protruding toward the circuit board 36 side. The terminals 62, 62 are connected to the circuit board 36. Further, one of the mover side fixed portions 58, 58 of the spring members 54, 54 is connected to one end of the coil 34, and the other one is connected to the other end of the coil 34.

In the above configuration, the lens is supported on the lens support 30 described above. The lens driving device 10 in which the lens is supported on the lens support 30 is mounted on the camera device. In the camera device, light input from the subject via the lens is detected by a light receiving sensor. The moving amount of the lens for focusing the subject is calculated by a controller provided in the camera device. The controller sends a control signal corresponding to the moving amount of the lens to the circuit board 36. Electric current flows to the coil 34 via the circuit board 36 and the rear side plate spring 46. When the electric current flows to the coil 34, an electromagnetic force in the optical axis direction is generated between the driving magnets 28, 28 and the coil 34. The electromagnetic force becomes a driving force for the lens support 30 and the lens support 30 moves against the front side plate spring 44 or the rear side plate spring 46. In the position detecting unit 38, the position of the position detecting magnet 40 is detected by the position detecting sensor 44, and feedback control is performed so that the lens support 30 is quickly stopped at the target position.

Thus, when the lens support 30 is stopped, resonance occurs in the lens support 30. Therefore, it is necessary to suppress the resonance of the lens support 30.

As shown in FIG. 5 to FIG. 11, the lens driving device 10 is provided with resonance suppression portions 64 at two corner portions that are opposed to each other. That is, the resonance suppression portions 64 are provided on both sides centered on the lens. The resonance suppression portion 64 is composed of a protruding portion 66, a recessed portion 68 and resin with viscoelasticity 70.

It should be noted that, the resonance suppression portion 64 is not provided at the corner portion where the position detecting unit 38 is disposed in order to ensure the installation of the position detecting unit 38. Further, the resonance suppression portion 64 is not provided at the corner portion opposing to the position detecting unit 38 in order to maintain balance.

The protruding portions 66 are formed to protrude from the circumference of the opening portion 22 of the case 18 toward the rear side integrally with the case 18 at two corner portions of the case 18 that are opposed to each other. The protruding portion 66 is formed by, for example, press working when manufacturing the case 18. Further, the recessed portion 68 is formed between the lens support 30 and the coil 34. The lens support 30 is provided with notches 72.

Figure 10:
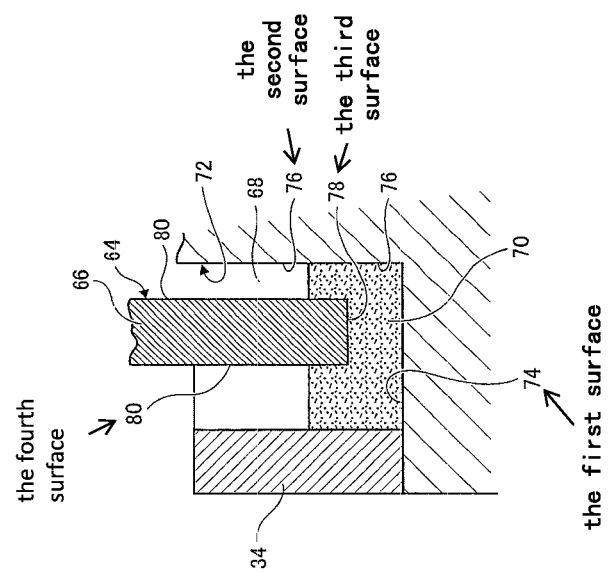
FIG. 10 is an enlarged cross-sectional view showing a resonance suppression portion in the lens driving device according to the embodiment of the present disclosure.
Figure 9:
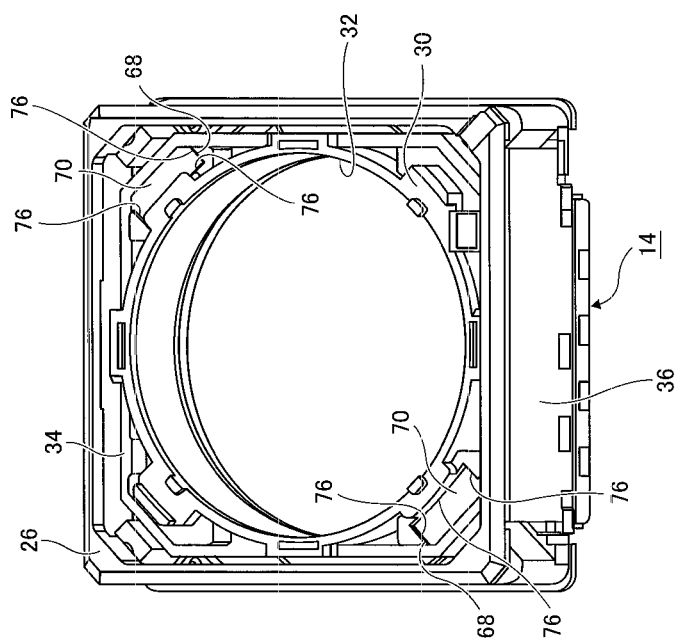
FIG. 9 is a perspective view showing a state in which the resin with viscoelasticity is injected into the recessed portions from the state of FIG. 8 in the lens driving device according to the embodiment of the present disclosure.
Figure 11:
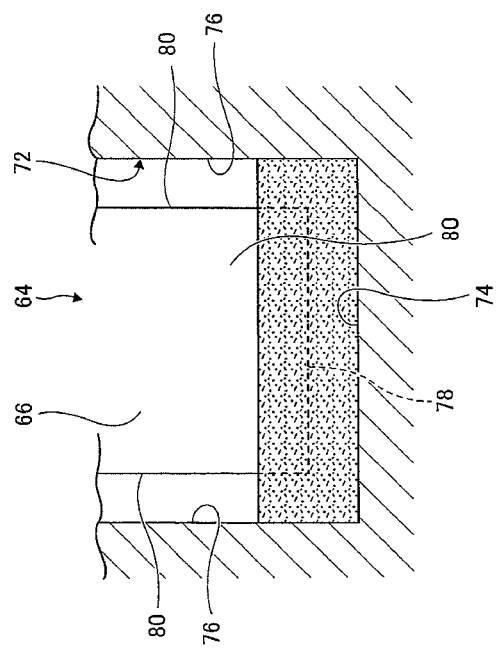
FIG. 11 is a cross-sectional view in a direction orthogonal to the cross section of FIG. 10 in the lens driving device according to the embodiment of the present disclosure.

As shown in FIG. 10 and FIG. 11, the notches 72 are formed by selectively cutting out the lens support 30 so that portions of the lens support 30 corresponding to the protruding portion 66 are cut out in parallel with the optical axis direction of the lens. That is, the notch 72 is composed of a first surface 74 that is a bottom surface formed in a direction orthogonal to the optical axis direction of the lens, and three second surfaces 76 rising from the first surface 74 to the front side in parallel with the optical axis direction of the lens. Among the three second surfaces 76, two surfaces on two sides are opposed to each other in a substantially circumferential direction. The remaining one surface faces outward in the radial direction. The recessed portion 68 is a portion surrounded by the first surface 74 and the three second surfaces 76 of the notch 72, and the inner surface of the coil 34.

The protruding portion 66 is inserted into the recessed portion 68. The protruding portion 66 has a length that maintains the insertion into the recessed portion 68 even when the mover 14 has moved to the maximum position on the rear side. The protruding portion 66 has a third surface 78 that is an insertion end surface, and fourth surfaces 80 that are four side surfaces rising from the third surface 78 to the front side in parallel to the optical axis direction. The third surface 78 of the protruding portion 66 is opposed to the first surface 74 of the notch 72 of the recessed portion 68, and the first surface 74 and the third surface 78 constitute opposing surfaces. Further, the three fourth surfaces 80 of the protruding portion 66 are opposed to the second surfaces 76 of the notch 72 of the recessed portion 68, and the three second surfaces 76 and the three fourth surfaces 80 constitute opposing surfaces. Further, the fourth surface 80 on the outside of the protruding portion 66 is opposed to the inner surface of the coil 34, and the fourth surface 80 and the inner surface of the coil 34 constitute opposing surfaces.

Resin with viscoelasticity 70 (hereinafter referred to as resin 70) is made of soft gel or soft adhesive, and is cured by heat or light to have a predetermined viscoelasticity. The resin 70 is disposed between the opposing surfaces of the protruding portion 66 and the recessed portion 68.

In this embodiment, the resin 70 is in contact with the above opposing surfaces by immersing the protruding portion 66 so that the tip end of the protruding portion 66 is covered. That is, in this embodiment, resin 70 is respectively provided between the first surface 76 of the recessed portion 68 and the third surface 80 of the protruding portion 66, between the three second surfaces 78 of the notch 72 and the three fourth surfaces 82 of the protruding portion 66, and between the inner surface of the coil 34 and the fourth surface 82 on the outer side of the protruding portion 66. But it may be provided between at least one pair of opposing surfaces. The resin 70 maintains a state in which the opposing surface of the protruding portion 66 and the opposing surface of the recessed portion 68 are in contact with each other even when the mover 14 has moved to the maximum position on the rear side.

Since the resin 70 is provided between the opposing surfaces of the protruding portion 66 and the recessed portion 68, it is possible to prevent that the opposing surfaces interfere with each other to generate friction and generate dust. For example, the fourth surfaces 80 on both sides in the circumferential direction of the protruding portion 66 can be used as a rotation stopper for the lens support 30. In that case, the second surfaces 76 on both sides of the notch 72 are opposed to and the fourth surfaces 80 on both sides of the protruding portion 66 and are in contact with the fourth surfaces 80. However, the following effect can be obtained by the presence of the resin 70 between the second surfaces 76 and the fourth surfaces 80: the direct contact of the two surfaces 76 and 80 is avoided; the impact would be reduced even if these surfaces contacted to each other; even if dust is generated, it is difficult to scatter outside since the dust is inside the resin 70.

It should be noted that, in the above embodiment, the driving magnets 28, 28 are provided on the stator 12 side and the coil 34 is provides on the mover 14 side, respectively, but conversely, the driving magnets 28, 28 may be provided on the mover 14 side and the coil 34 may be provided on the stator 12 side, respectively. In this case, the recessed portions 68 can be constituted by the notches 72 of the mover 14 and the inner surfaces of the driving magnets 28, 28.

Further, in the above embodiment, the protruding portion 66 is provided so that the direction in which the protruding portion 66 is inserted into the recessed portion 68 is parallel to the optical axis direction of the lens, but the present disclosure is not limited to this, and may be formed in any direction as long as the movement of the mover 14 can be ensured. For example, the protruding portion 66 may be formed to protrude in a direction orthogonal to the optical axis direction of the lens, the recessed portion 68 may be formed in a direction orthogonal to the optical axis direction of the lens of the lens support 30, and the protruding portion 66 may be inserted into the recessed portion 68 in a direction orthogonal to the optical axis direction of the lens. Further, in the above embodiment, the protruding portion 66 is provided on the stator 12 side and the recessed portion 68 is provided on the mover side, respectively, but conversely, the protruding portion 66 may be provided on the mover 14 side and the recessed portion 68 may be provided on the stator 12 side. Further, the recessed portion 68 may be formed only by the lens support 30 without using the coil 34. Further, the resonance suppression portion 64 may be provided at each corner portion, and may be provided not only at a corner portion but at an edge portion. Further, although the case 18 has a function of a yoke, the case 18 may be formed of a non-magnetic body.

It is to be noted that, in this specification, a lens driving device used in a camera device has been described, but the present disclosure can also be applied to other devices.

What is claimed is:

1. A lens driving device comprising:
a stator; and
a mover comprising a lens support for supporting a lens and moving in an optical axis direction of the lens with respect to the stator, wherein:
the stator has protruding portions,
the mover has recessed portions into which the protruding portions are inserted,
the protruding portions and the recessed portions each have opposing surfaces where the protruding portions and the recessed portions are opposed to each other, and resin with viscoelasticity is provided so as to contact the opposing surfaces of the protruding portions and the opposing surfaces of the recessed portions, and
wherein the mover comprises a coil for moving the mover, and the recessed portions are formed so as to be surrounded by the lens support and the coil.

2. The lens driving device according to claim 1, wherein the lens support is provided with notches cut out in an optical axis direction of the lens, and the recessed portions are formed between the notches and the coil.

3. The lens driving device according to claim 2, wherein the notch has a first surface and second surfaces, the first surface is formed in a direction intersecting with the optical axis direction of the lens, the second surfaces are formed in a direction rising from the first surface to a front side in parallel with the optical axis direction of the lens, and the opposing surfaces of the recessed portion are formed to have an inner surface of the coil, the first surface and the second surfaces.

4. The lens driving device according to claim 3, wherein among the second surfaces, two surfaces formed in a direction rising from both sides in the circumferential direction of the first surface are opposed to the opposing surfaces formed at both ends in the circumferential direction of the protruding portion through the resin with viscoelasticity.

5. The lens driving device according to claim 1, wherein the stator has a case surrounding the mover, the case is a box-like body with an opening at center, and the protruding portions protrude from a circumference of the opening toward the inside of the box-like body.

6. The lens driving device according to claim 5, wherein the case has a substantially rectangular shape with four corner portions when viewed from the optical axis direction of the lens, and the protruding portions are provided at two opposing corner portions of the case.

7. The lens driving device according to claim 1, wherein the protruding portions and the recessed portions are provided on both sides centered on the lens.

8. The lens driving device according to claim 1, wherein the resin with viscoelasticity maintains a state in which the resin contacts both of the surfaces of the protruding portion opposing thereto and the surfaces of the recessed portion opposing thereto even when the mover has moved to a maximum position in the optical axis direction of the lens.

9. A camera device comprising:
   the lens driving device according to claim 1;
   a lens supported by the lens support; and
   a light receiving sensor detecting light transmitted through the lens.

10. An electronic apparatus comprising a camera device according to claim 9.

\* \* \* \* \*